(12) United States Patent
Sensenig

(10) Patent No.: US 7,624,783 B2
(45) Date of Patent: Dec. 1, 2009

(54) CURTAIN SYSTEM FOR DOMESTIC ANIMAL SHELTER

(76) Inventor: Luke G. Sensenig, 255 Holtzman Rd., Reinholds, PA (US) 17569

(*) Notice: Subject to any disclaimer, the term of this patent is extended or adjusted under 35 U.S.C. 154(b) by 202 days.

(21) Appl. No.: 11/456,993

(22) Filed: Jul. 12, 2006

(65) Prior Publication Data
US 2008/0011433 A1   Jan. 17, 2008

(51) Int. Cl.
*E04F 10/06* (2006.01)

(52) U.S. Cl. .................... 160/23.1; 160/120; 160/243; 160/250

(58) Field of Classification Search .......... 160/DIG. 15, 160/23.1, 24, 246, 250, 252, 254, 255, 257, 160/258, 259, 260, 309, 263, 392, 395; 285/66
See application file for complete search history.

(56) References Cited

U.S. PATENT DOCUMENTS

| | | | |
|---|---|---|---|
| 0,192,019 A | 6/1877 | Sawyer | |
| 192,019 A * | 6/1877 | Sawyer | 160/248 |
| 1,069,584 A * | 8/1913 | Schindler | 160/29 |
| 1,201,591 A * | 10/1916 | Joseph | 160/29 |
| 1,480,387 A * | 1/1924 | Garrett | 160/21 |
| 1,862,385 A | 6/1932 | Morey | |
| 3,372,728 A * | 3/1968 | Schaefer | 160/39 |
| 3,878,878 A * | 4/1975 | Reeder | 160/246 |
| 4,103,401 A * | 8/1978 | Conley | 24/462 |
| 4,107,826 A * | 8/1978 | Tysdal | 24/460 |
| RE31,746 E * | 11/1984 | Dimmer et al. | 296/98 |
| 4,566,236 A * | 1/1986 | Pound | 52/222 |
| 4,742,860 A * | 5/1988 | Debs | 160/178.1 V |
| 4,766,941 A * | 8/1988 | Sloop et al. | 160/241 |
| 4,846,241 A * | 7/1989 | Chomka et al. | 160/23.1 |
| 4,847,958 A * | 7/1989 | Conley | 24/461 |
| 4,947,561 A * | 8/1990 | Delacroix et al. | 38/102.91 |
| 5,179,767 A * | 1/1993 | Allan | 24/442 |
| 5,224,306 A * | 7/1993 | Cramer | 52/63 |
| 5,271,634 A * | 12/1993 | Walton | 280/33.992 |
| 5,392,576 A * | 2/1995 | Yeamans | 52/408 |
| 5,520,236 A * | 5/1996 | Thomas et al. | 160/120 |
| 5,647,421 A * | 7/1997 | Hoffmann et al. | 160/120 |
| 5,813,599 A * | 9/1998 | Hoff | 236/49.3 |
| 5,899,254 A * | 5/1999 | Cook | 160/321 |
| 5,906,078 A * | 5/1999 | Cramer | 52/222 |
| 6,042,475 A * | 3/2000 | Darden | 454/274 |
| 6,230,582 B1 * | 5/2001 | Becker et al. | 74/545 |
| 6,394,172 B1 * | 5/2002 | Kessous | 160/264 |
| 6,547,307 B2 * | 4/2003 | Schlecht et al. | 296/97.4 |
| 6,612,359 B1 * | 9/2003 | Moreau | 160/120 |

(Continued)

*Primary Examiner*—Katherine W Mitchell
*Assistant Examiner*—Philip S Kwon
(74) *Attorney, Agent, or Firm*—Lowe Hauptman Ham & Berner LLP

(57) ABSTRACT

Disclosed is a curtain system for a side of a shelter for domestic animals, wherein the side is open except for an animal restraining grid and the curtain system. The system includes an elongated tube horizontally mounted outside the grid. The tube carries a shaft about which an elongated curtain is wound. A horizontally extending end of the curtain protrudes through a slot of the tube. A drive raises and lowers the tube relative to the grid and winds and unwinds the curtain to raise and lower the curtain relative to the grid. The raising and lowering of the tube are independent of the winding and unwinding of the curtain. A fixed cable keeps the tube and curtain proximate the grid.

20 Claims, 11 Drawing Sheets

U.S. PATENT DOCUMENTS

| | | | |
|---|---|---|---|
| 6,644,379 B1 * | 11/2003 | Nei | 160/243 |
| 7,144,047 B2 * | 12/2006 | Dole | 285/233 |
| 7,217,061 B2 * | 5/2007 | Stratton | 404/6 |
| 2006/0219373 A1 * | 10/2006 | McKinney | 160/395 |
| 2006/0219374 A1 * | 10/2006 | McKinney | 160/395 |
| 2006/0233599 A1 * | 10/2006 | Lah | 403/292 |
| 2007/0012411 A1 * | 1/2007 | Weight | 160/395 |
| 2007/0206989 A1 * | 9/2007 | Wagner et al. | 403/297 |

* cited by examiner

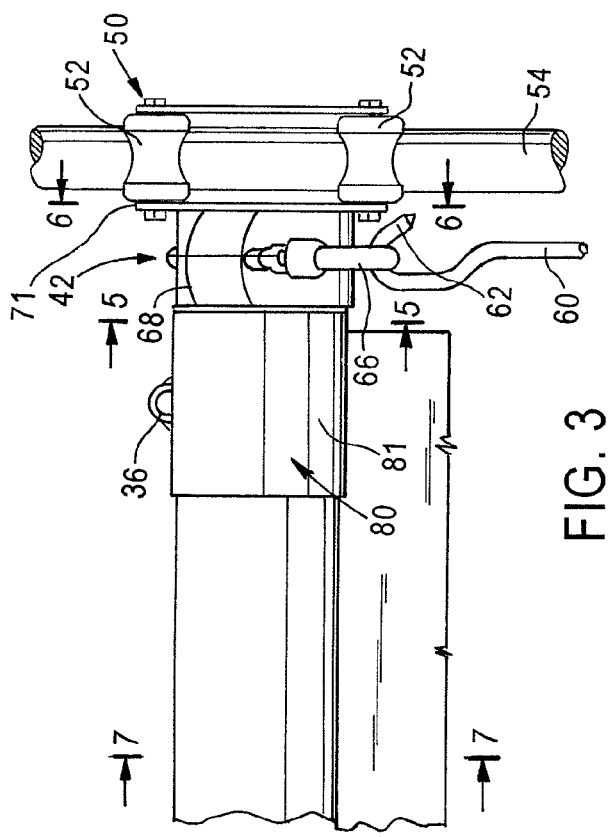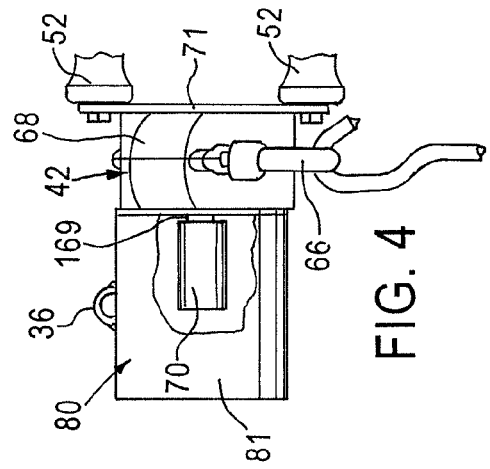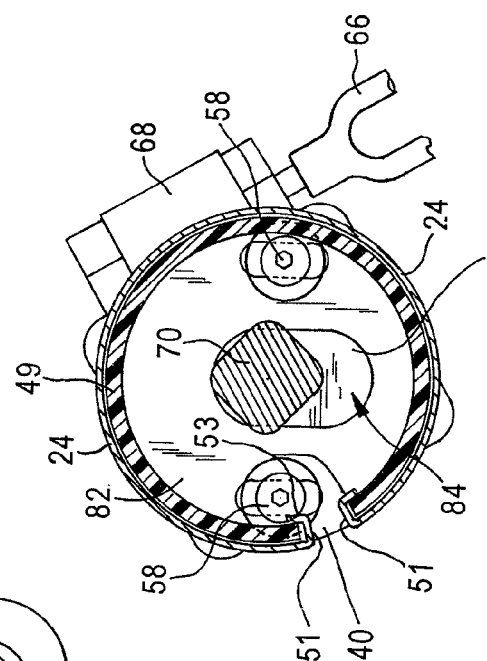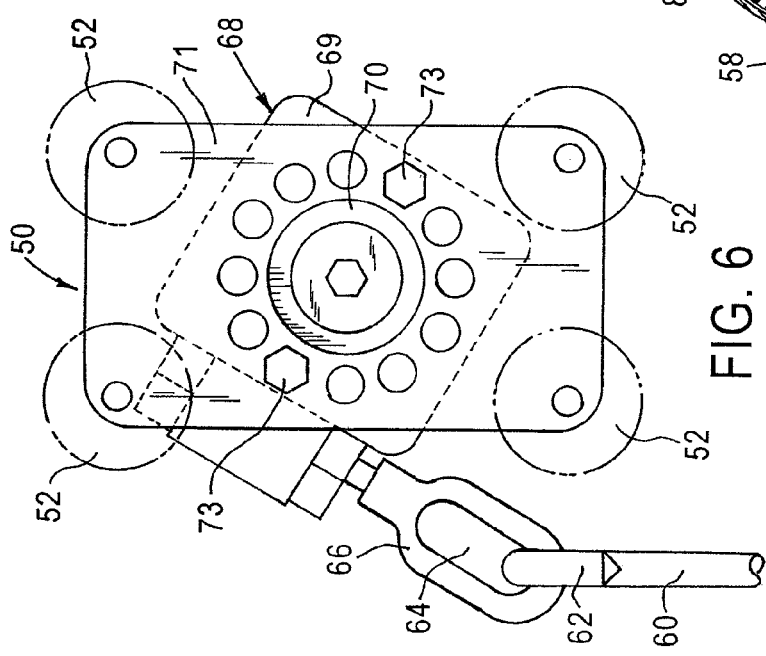

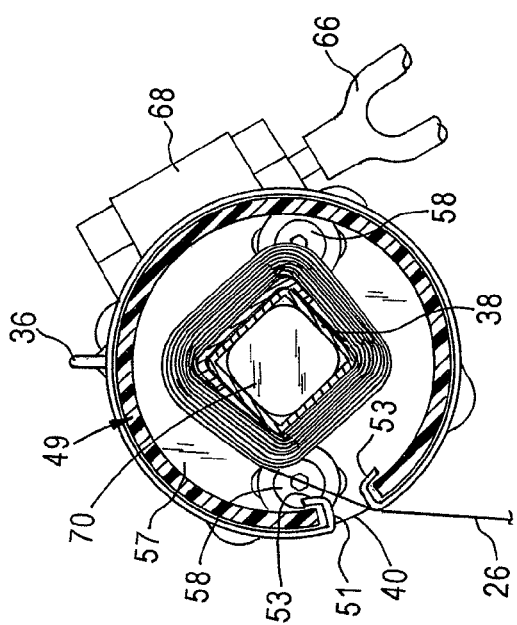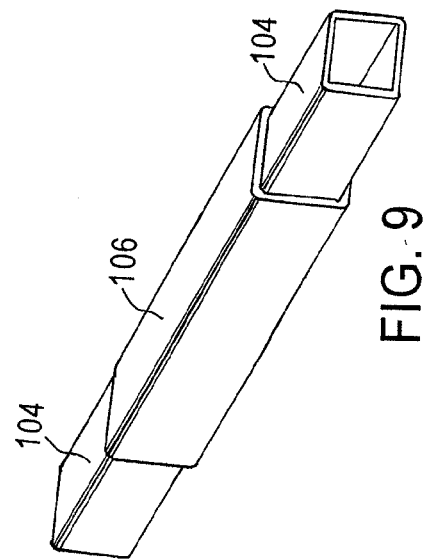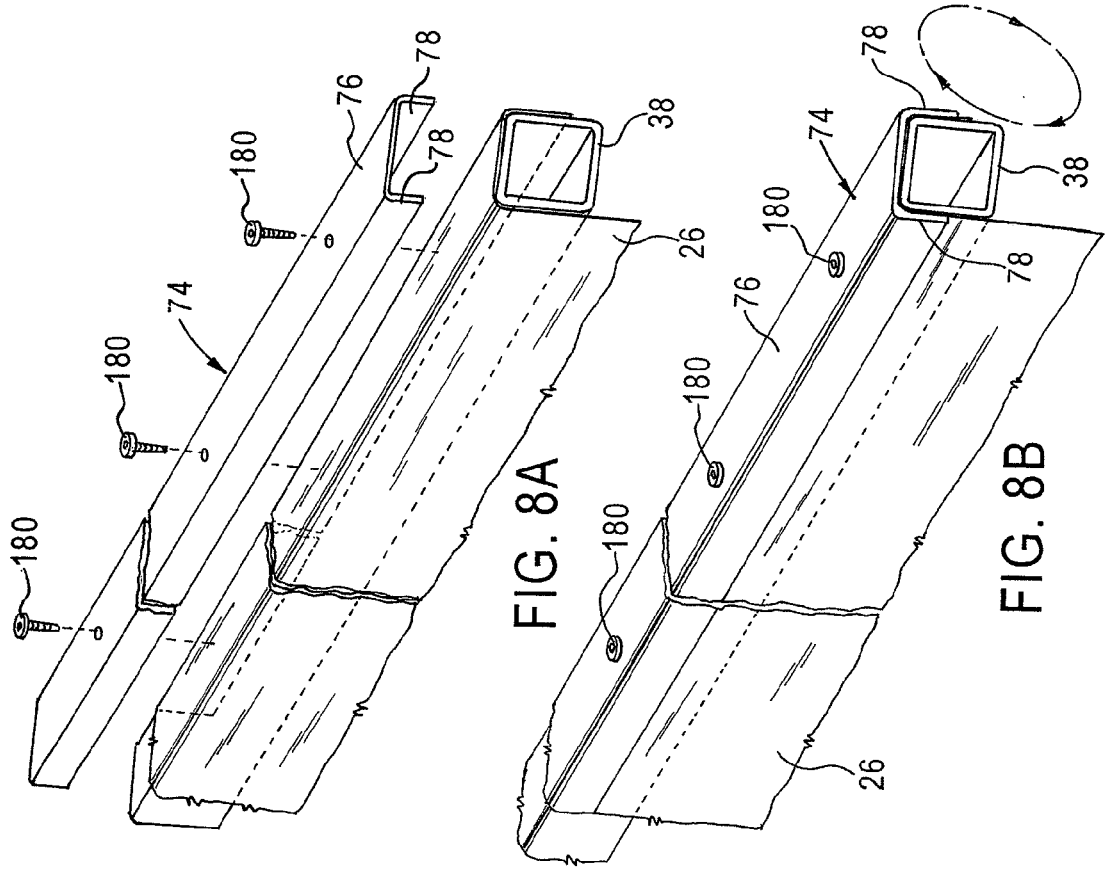

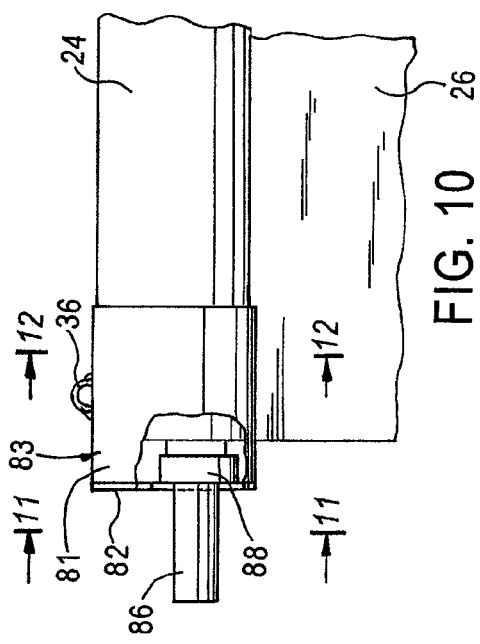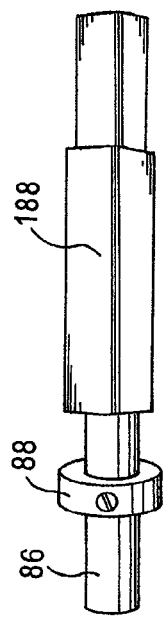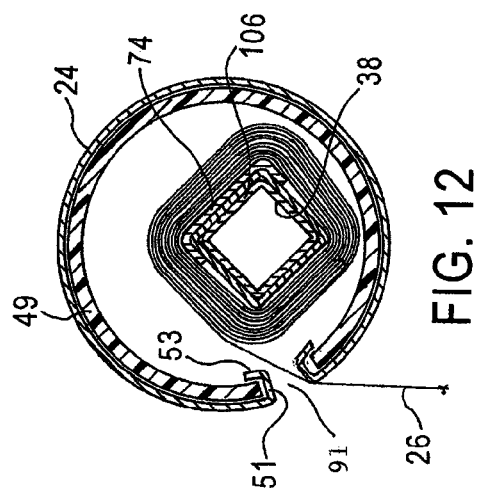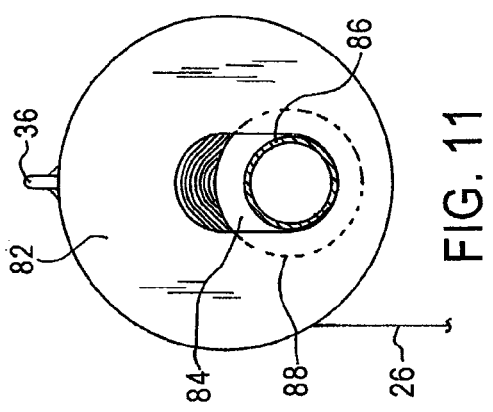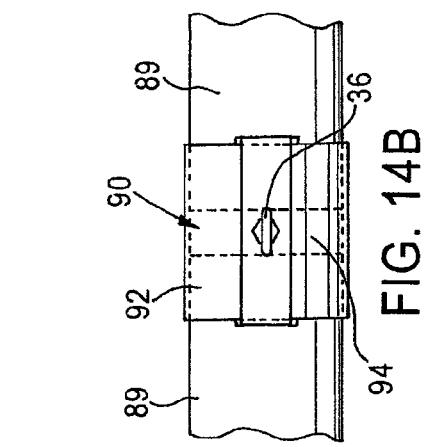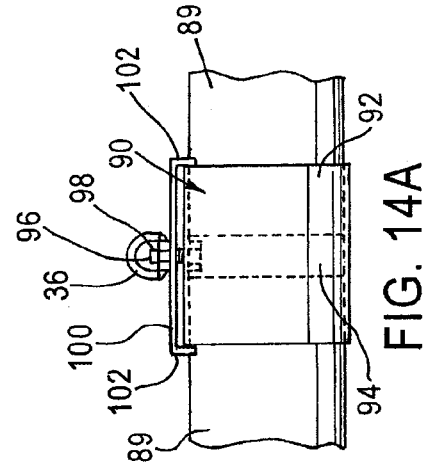

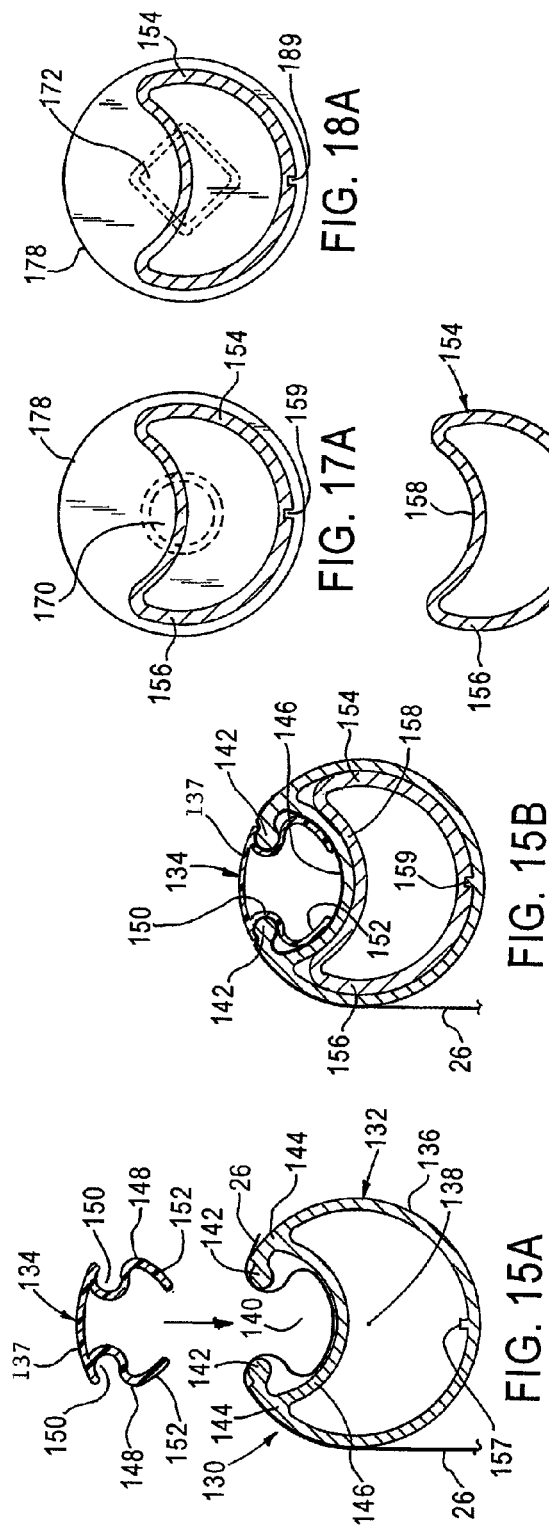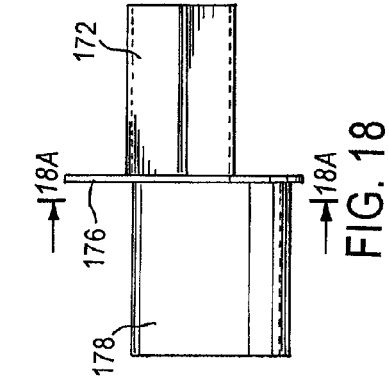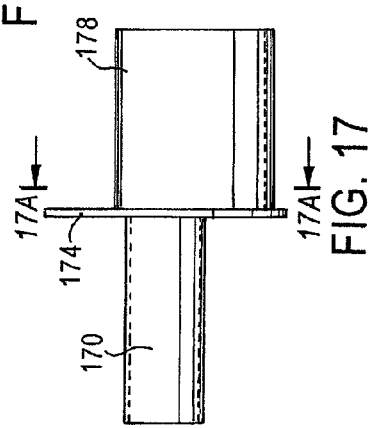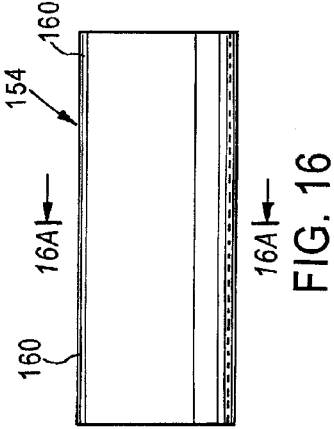

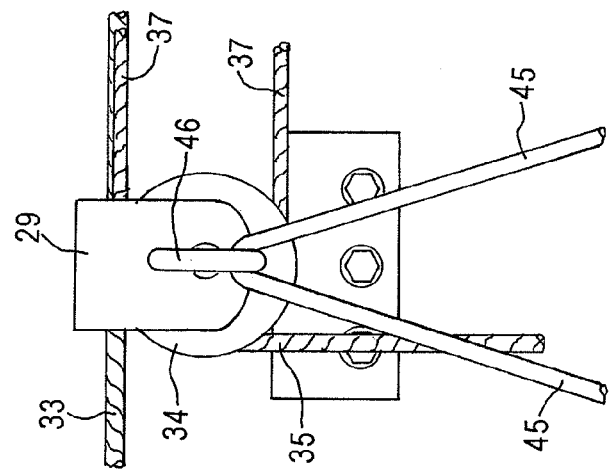
FIG. 19B
FIG. 19A
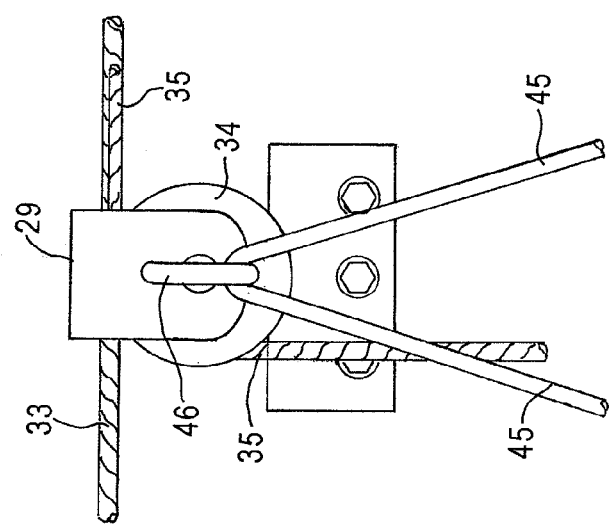
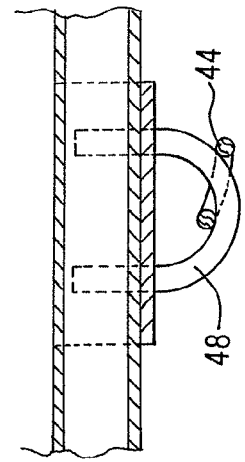
FIG. 20A
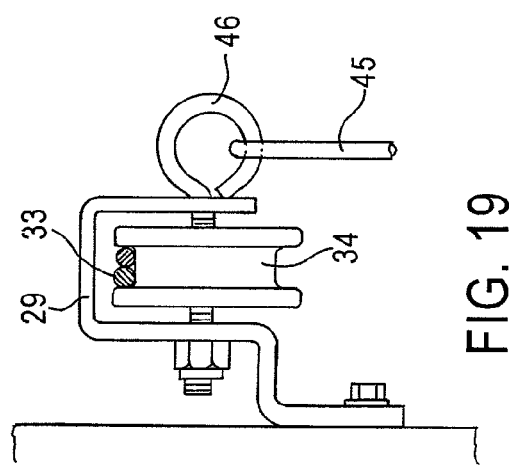
FIG. 19
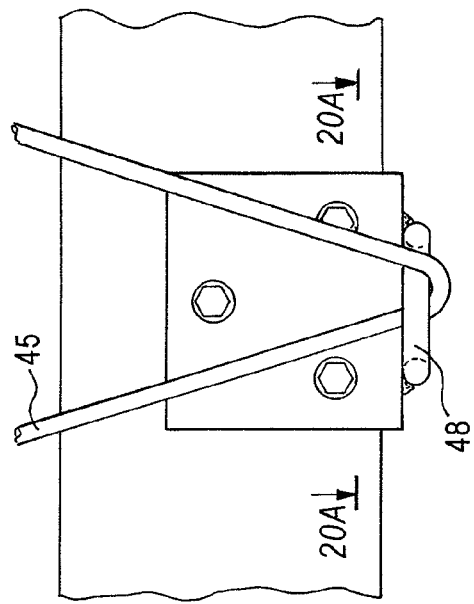
FIG. 20

CURTAIN SYSTEM FOR DOMESTIC ANIMAL SHELTER

FIELD OF THE INVENTION

The present invention relates generally to curtain systems for shelters for farm animals, i.e., domestic livestock and fowl, and more particularly to such a curtain system including a curtain that can be rolled up and down from inside a tube that can be raised and lowered against a substantially open side of the shelter.

BACKGROUND ART

A type of farm animal shelter currently in use includes an elongated substantially open side, usually positioned in the direction of the prevailing wind as the wind is incident on the shelter. To prevent escape of the animals from the shelter, the open side includes a wire grid. The shelter further includes two side walls and a front elongated wall including gates for providing ingress and egress of the animals and humans to and from the shelter that is roofed.

Curtain systems are located on the open side, outside the grid. A typical prior art curtain system includes a curtain that is raised and lowered depending upon the protection desired for the animals within the shelter and the ventilation required by these animals. A shaft carrying the curtain is in some systems also raised and lowered.

Another type of shelter includes two contained parallel walls with cross ventilation. A problem with both of the prior art curtain systems is that the curtain and other structures, under certain circumstances, must lie on a shelf or other surfaces immediately outside the grid. For example, parts of the curtain gather on the ground. As a result, water, rain, ice, snow and dirt accumulate in the curtain and other structures of the curtain system. The accumulation of such elements on the curtain and/or curtain system components has detrimental effects with regard to the operation and longevity of the curtain system. It is frequently difficult to install the prior art curtain system, particularly if the curtain and building are long, e.g. over 50 feet.

It is, accordingly, an object of the present invention to provide a new and improved curtain system for farm animal shelters having one or more substantially open sides.

Another object of the invention is to provide a new and improved curtain system for substantially open sides of farm animal shelters, which system substantially avoids problems associated with curtains and curtain system components being adversely affected by environmental elements, including damage due to rodent activity such as nesting.

An additional object of the present invention is to provide a new and improved curtain system that is relatively easy to operate, is relatively maintenance free, is relatively inexpensive and is easily installed.

SUMMARY OF THE INVENTION

An aspect of the invention is directed to a new and improved curtain system for a generally open side of a shelter for farm animals. The side is generally open except for (a) a restraining grid for the animals and (b) the curtain system. The curtain system comprises a tube having an elongated axis adapted to be horizontally mounted outside the restraining grid. The tube has an elongated slot extending in the same direction as the elongated axis of the tube. The tube carries a shaft extending in the same direction as the elongated axis of the tube and about which an elongated curtain is wound. The curtain has a horizontally extending end protruding through the slot. A drive arrangement raises and lowers the tube relative to the open side of the shelter and for winding and unwinding the curtain about the shaft so that the winding and unwinding of the curtain causes a free end of the curtain outside the tube to be raised and lowered relative to the side of the shelter. The drive arrangement is such that the raising and lowering of the tube and the winding and unwinding of the curtain are independent of each other. A restraining structure keeps the tube and curtain proximate the grid.

The drive arrangement preferably includes a cable and pulley arrangement connecting different portions along the length of the tube to a first rotary drive for the raising and lowering of the tube.

The drive arrangement also preferably includes a second rotary drive that is substantially coaxial with the shaft for turning the shaft about a longitudinal axis thereof.

The restraining structure preferably includes an elongated element that extends from above the highest point of traverse of the tube to below the lowest point of traverse of the free end of the curtain.

Preferably, the elongated element includes a cable extending between a first set of hooks above the highest point of traverse of the tube and a second set of hooks below the lowest point of traverse of the free end of the curtain.

Frequently the open side has a substantial length, e.g., in excess of 100 feet. In such cases, the tube is preferably divided into plural elongated sections, together having lengths approximately equal to the substantial length of the side. The elongated sections of the tube are coupled together end to end so that slots in each elongated tube section are longitudinally aligned and the shaft is divided into plural elongated sections. Each of the elongated sections of the shaft has a length approximately equal to the length of a corresponding section of the tube in which a particular elongated section of the shaft is located. A coupler connects adjacent ends of the shafts of the elongated shaft sections to each other. The curtain in such cases includes a continuous piece of fabric extending across a plurality of the couplers and wound on the plural aligned elongated sections of the shaft and extending through the slots in the plural elongated sections of the tube.

The shaft has different vertical positions within the tube depending upon the load of the curtain on the shaft extending through the slot. An end plate of the tube at a free non-driven end of the shaft has an elongated vertically extending slot through which a portion of the shaft extends. The elongated vertically extending slot has a length sufficient to enable the free end of the shaft to have the different vertical positions within the tube.

In one embodiment, the shaft periphery has a square cross-section about which the curtain is wound. A keeper fitting on the shafts holds in place on the shaft a second end of the curtain opposite from the free end.

The keeper for the shaft having the square cross section is preferably shaped as a channel having (1) a base extending across a first side of the square cross-section and (2) flanges extending across portions of opposite second and third sides of the square cross-section.

In a second embodiment, the shaft periphery has a cross-section in the shape of a circle about which the curtain is wound. A first portion of the shaft has a peripheral segment in the form of a first sector of the circle and clamps into a second portion of the shaft having a peripheral segment in the form of a second sector of the circle. The first portion of the shaft is a keeper holding the second end of the curtain in place on the second portion of the shaft.

The second portion of the circular shaft preferably includes opposing ears and first arcuate surfaces. The first portion of the shaft includes opposing recesses and second arcuate surfaces respectively mating with the opposing ears and first arcuate surfaces. The opposing ears, recesses, and first and second arcuate surfaces hold the second end of the curtain in place.

The above and still further objects, features and advantages of the present invention will become apparent upon consideration of the following detailed description of spacing between words specific embodiments thereof, especially when taken in conjunction with the accompanying drawings.

BRIEF DESCRIPTION OF THE DRAWINGS

FIG. 3 is a detailed front view of a mechanism that enables the tube of FIGS. 1 and 2 to be driven upwardly and downwardly, in combination with a drive mechanism for turning a shaft bearing a curtain within the tube;

FIG. 4 is a partial view of the structure illustrated in FIG. 3 including a cut away having a drive mechanism for the shaft within the tube;

FIG. 5 is a side sectional view, taken through the lines 5-5, FIG. 3;

FIG. 6 is a side sectional view taken though the lines 6-6 of FIG. 3;

FIG. 7 is a sectional view taken through the line 7-7 of FIG. 3;

FIG. 8A is an exploded perspective view of a channel shaped keeper for maintaining an end of the curtain on a shaft having a square cross section on which the curtain is wound and unwound;

FIG. 8B is a perspective view, similar to the exploded view of FIG. 8A, but wherein the keeper is illustrated as holding the curtain in situ on the square shaft;

FIG. 9 is a perspective view of a square sleeve for coupling two adjacent elongated square shaft sections together, wherein the coupling sleeve is coaxial with and surrounded by the ends of the elongated, adjacent square shafts;

FIG. 10 is a front view of the tube and curtain at an end of the tube opposite from the end of the tube illustrated in FIG. 3;

FIG. 11 is a side view taken through the lines 11-11, FIG. 10;

FIG. 12 is a side sectional view taken through the lines 12-12 of FIG. 10;

FIG. 13 is a perspective view of the square shaft, a square sleeve, a round coupling shaft and a collar, at the end of the tube illustrated in FIG. 10;

FIG. 14A is a side view of a coupler for holding a pair of adjacent tube sections in place, to assist in forming the elongated tube structure illustrated in FIG. 1;

FIG. 14B is a top view of the structure illustrated in FIG. 14A;

FIG. 15A is an exploded cross sectional view of a second embodiment of a shaft that can be used in lieu of the square shaft, wherein the shape of the tube of FIG. 15A, when assembled, has a two piece circular periphery, such that one piece is a curtain keeper that clamps on a second piece to hold the curtain in place;

FIG. 15B is a side sectional view of the structure illustrated in FIG. 15A, but wherein the keeper is shown as clamped in place, in combination with a coupling sleeve between a pair of the tubes of the type illustrated in FIG. 15A;

FIG. 16 is a side view of the coupling sleeve illustrated in FIG. 15B;

FIG. 16A is a cross sectional view taken through the lines 16A of FIG. 16;

FIG. 17 is a side view of the idle end of a tube including the shaft of FIGS. 15A and 15B;

FIG. 17A is a cross sectional view taken through line 17A, FIG. 17;

FIG. 18 is a side view of the driven end of a tube including the shaft of FIGS. 15A and 15B;

FIG. 18A is a cross sectional view taken through the lines 18A, FIG. 18;

FIG. 19 is a side view of a pulley wheel assembly mounted toward the top of the open side of the shelter illustrated in FIGS. 1 and 2, in combination with (1) cables for (a) pulling the tube carrying the curtain up and (b) enabling the tube to descend, and (2) a hook mechanism carried by the pulley wheel assembly for cables that maintain the curtain system proximate to the open side of the shelter;

FIG. 19A is a front view of the structure illustrated in FIG. 19, wherein a first cable segment rides in a groove at the top of the pulley wheel and a second cable segment turns 90° in the pulley wheel groove, from a horizontal direction to a vertical direction;

FIG. 19B is an illustration of the pulley wheel assembly of FIG. 19, wherein the first and second cable segments are as illustrated in FIG. 19A and a third cable segment turns 180° in the pulley wheel groove;

FIG. 20 is a front view of the hook mechanism for the restraining cable, at the bottom of the open side of the shelter of FIGS. 1 and 2;

FIG. 20A is a sectional view taken through the lines 20A, FIG. 20;

DETAILED DESCRIPTION OF THE DRAWINGS

Figure 1:
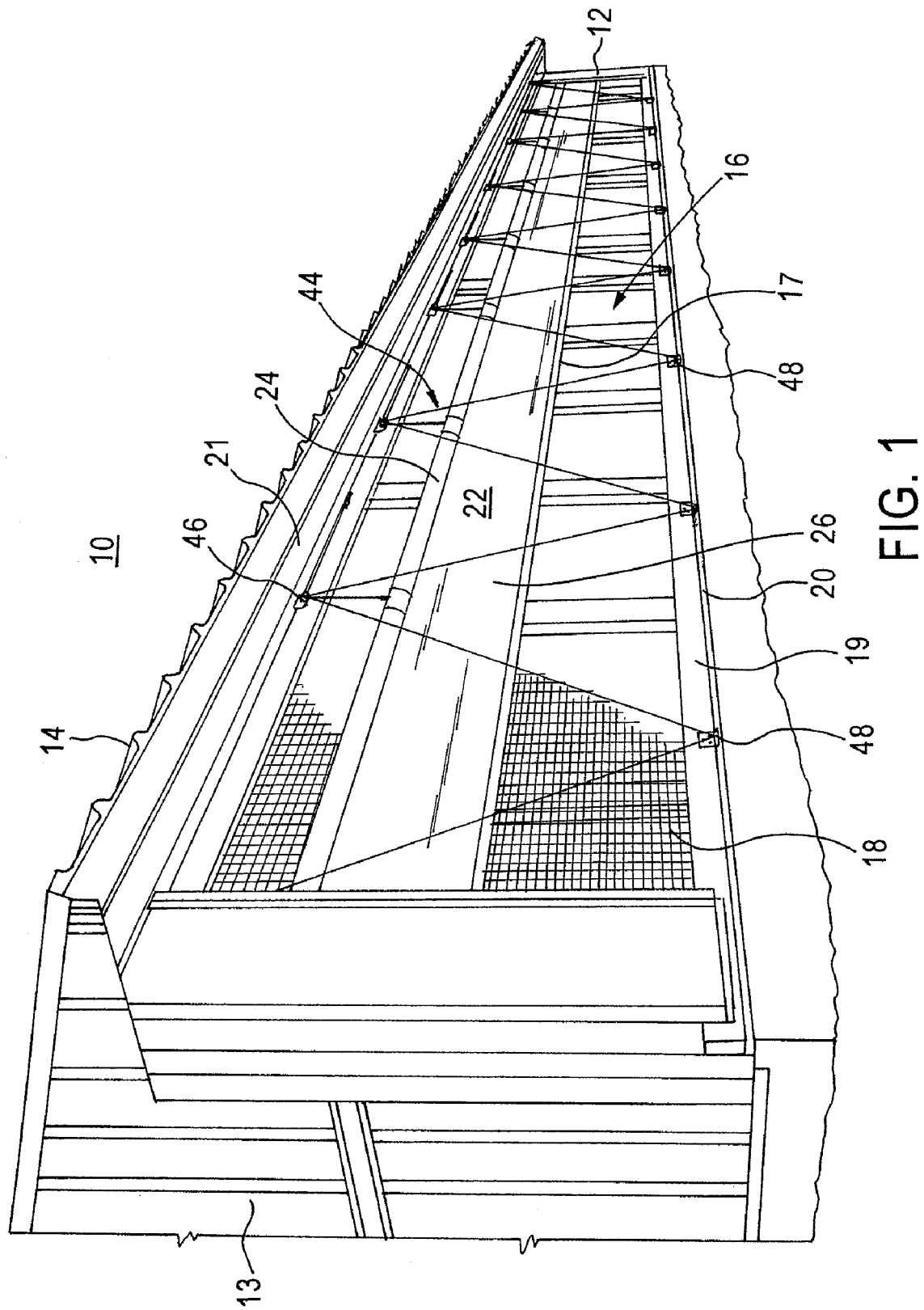
FIG. 1 is a perspective view of a shelter for domestic farm animals including a curtain system in accordance with a preferred embodiment of the present invention.

Reference is now made to FIGS. 1, 2, 2a and 2b wherein shelter 10 for domestic farm animals, i.e., fowl and live stock, such as cattle, swine, sheep, and goats, are housed. Shelter 10 includes a pair of parallel side walls 12 and 13, a front elongated side (not shown) including gates for enabling ingress and egress of the animals and personnel for tending them, roof 14 and elongated generally open side 16 that is parallel to the front side. Typically, the front and back side 16 have lengths of anywhere between 20 feet and in excess of 100 feet.

Side 16 includes a metal wire grid or mesh or 18 that restrains movement of the farm animals in shelter 10 and extends the entire length of side 16 from close to the base or floor 20 to close to the bottom of roof 14 of shelter 10. Typically, side 16 faces in the direction of the prevailing wind so that the prevailing wind can easily move through grid 18. Shelters 10, as described to this point, are known in the art, and include a curtain system for covering grid 18.

Figure 2:
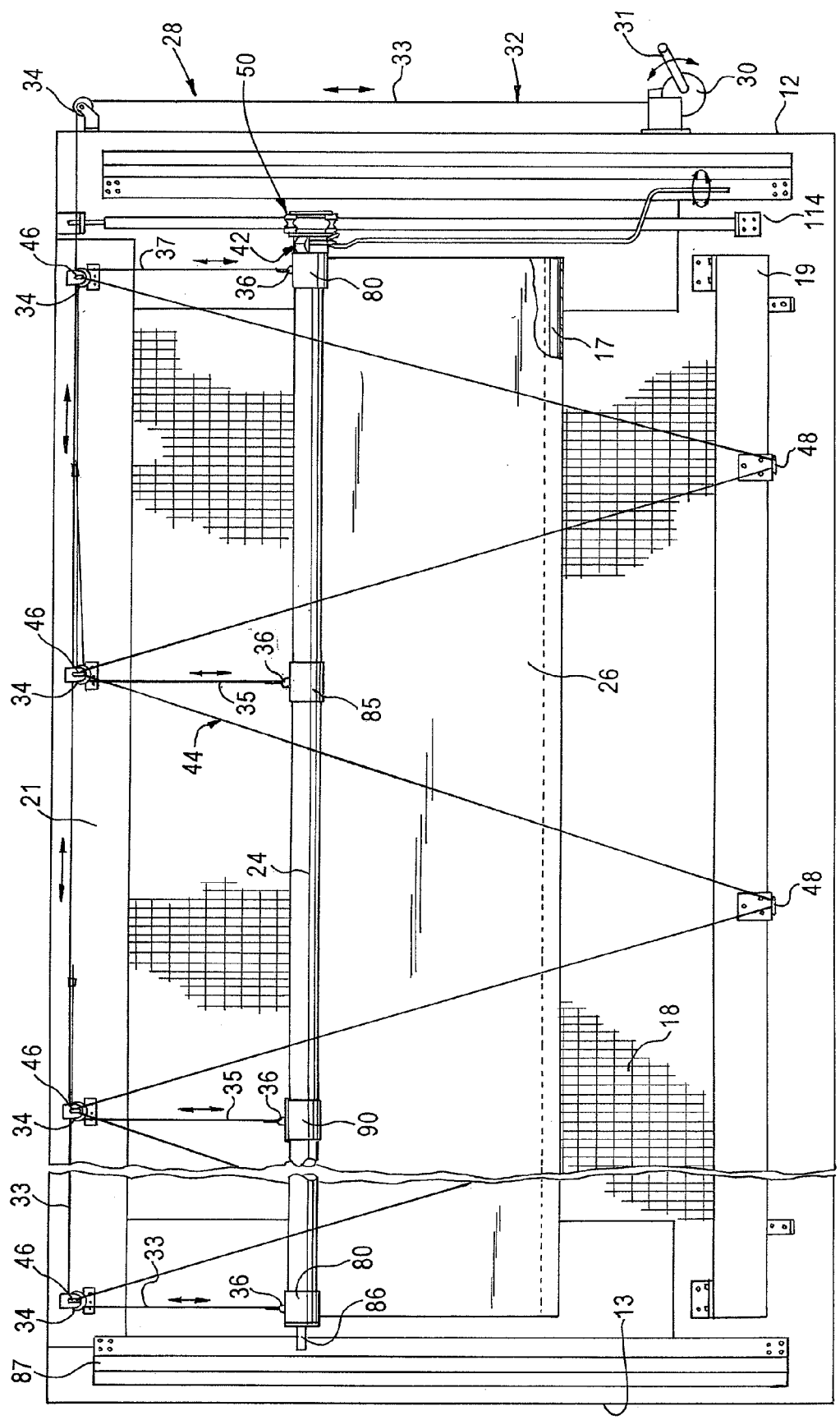
FIG. 2 is a partial front view of the shelter of FIG. 2, wherein a curtain holding tube of the curtain system is approximately ⅓ of the way from the top of an open side of the shelter and the bottom of the curtain of the curtain system is approximately ⅓ from the bottom of the open side of the shelter.
Figure 2A:
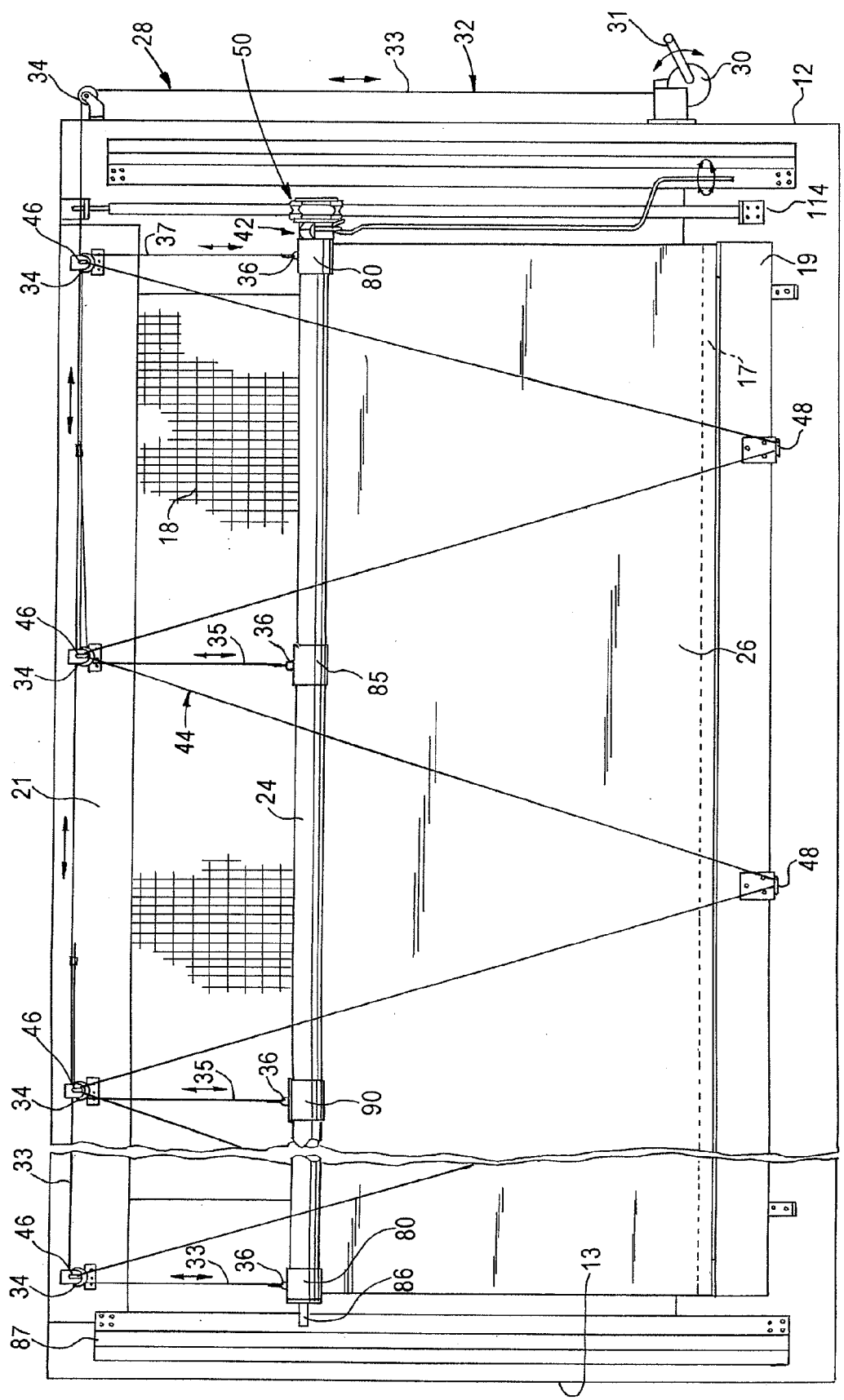
FIG. 2A is a front view similar to FIG. 2, but wherein the bottom of the curtain is at the bottom of the open side.
Figure 2B:
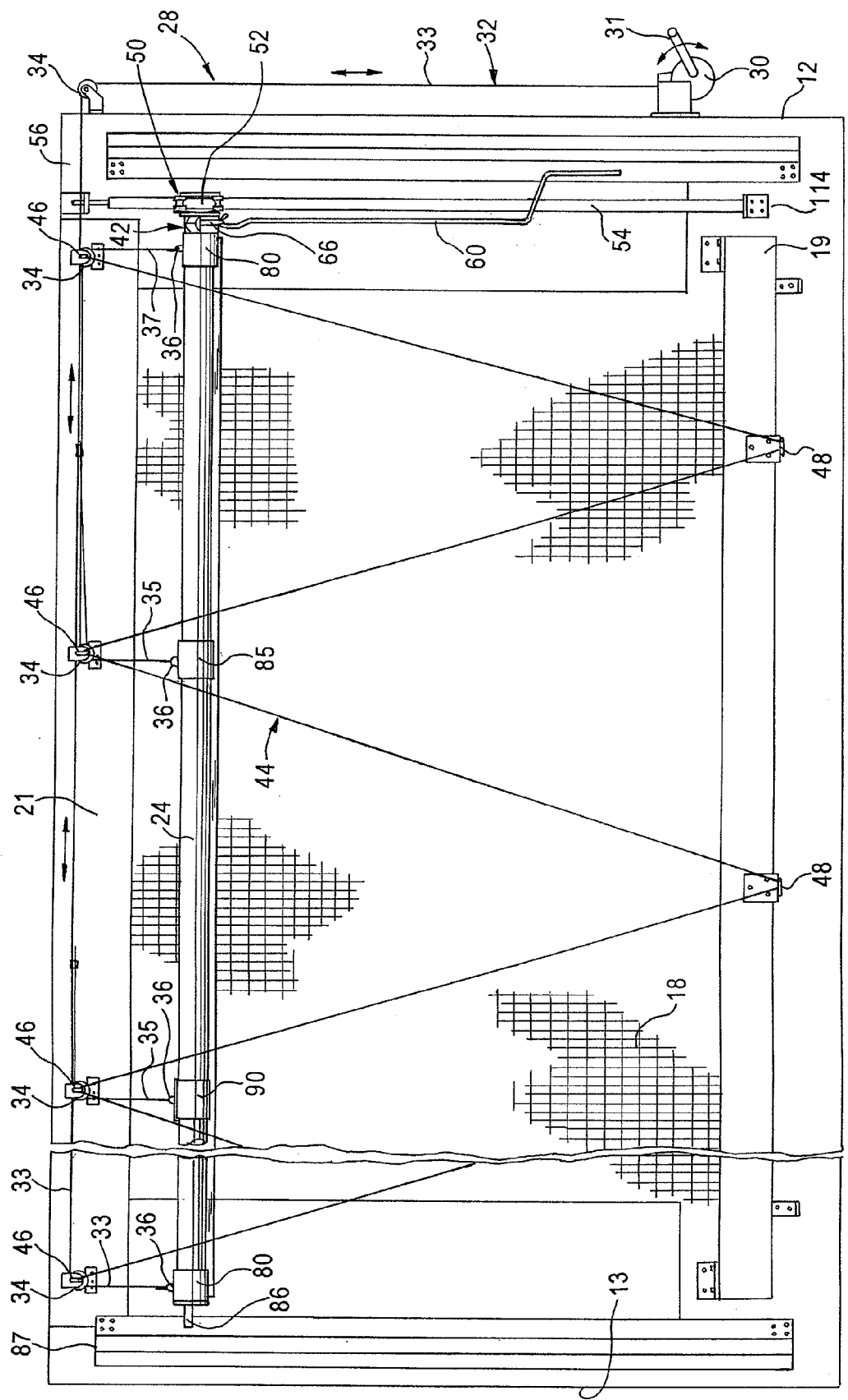
FIG. 2B is a front view similar to the front views of FIGS. 2 and 2A, but wherein the tube is close to the top of the open side and the curtain is almost fully drawn into the tube.

The following description is directed to an improved curtain system 22, including tube 24 that carries curtain 26 that extends from one edge of grid 18 adjacent one of sides 12 to the other edge of the grid, adjacent the other side 13. Drive arrangement 28 is coupled with tube 24 and curtain 26 to raise and lower the tube, as well as to raise and lower the curtain relative to the tube. The tube and curtain are raised and lowered independently of each other as illustrated in FIGS. 2, 2A and 2B.

Drive arrangement 28 includes (1) wheel 30 that is located on side wall 12 and manually driven by ratcheted crank 31 or by a motor, (2) cable 32 and (3) plural pulley wheels 34. Drive arrangement 28 enables tube 24 to be pulled above the top of mesh 26 where pulley wheels 34 are located or lowered close to the bottom of the mesh and all locations between them.

Cable 32 has an elongated portion 33 that extends upwardly from wheel 30 to a pulley wheel 34 or side 12, thence across side 16 above mesh 18, to the pulley wheel closest to side wall 13, thence downwardly to the portion of tube 24 closest to side wall 13. The segment of portion 33 that extends across the top of side 16 engages grooves in the pulley wheels above mesh 18. Cable 32 also has plural sections 35, each having a first end connected to a loop 36 that is fixedly connected to the top of tube 24.

Figure 23:
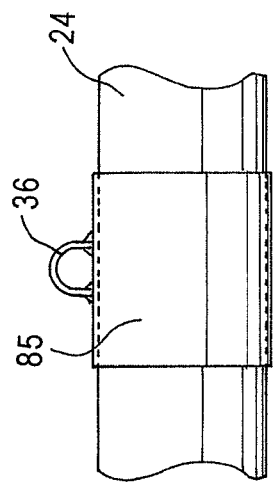
FIG. 23 is a side view of the tube of FIG. 2 in combination with a sleeve that carries a loop that forms an eye.

Loops 36 are horizontally aligned and typically spaced about 6½ feet from each other along the length of tube 24. Most of loops 36 are fixedly mounted on sleeves 85 (FIG. 23), but about every third loop 36 is mounted on sleeves 90 that couple adjacent elongated sections of tube 24 together. There are also loops 36 on sleeves 81 at the opposite ends of tube 24. Loops 36 and the surfaces of tube 24 or sleeves 81, 85 and 90 directly beneath the loops form eyes through which sections of cable 32 extend.

First ends of sections 33 and 35 of cable 32 extend through the eyes including loops 36. The first ends are pulled upwardly and are clamped to the portions of the sections of cable 32 that extend between loops 36 and pulley wheels 34 that are fixedly mounted on upper facing 21 on which the upper part of mesh 18 is mounted. Second ends of cable sections 35 are clamped to the upper segment of cable portion 33 to the right (as illustrated in FIG. 2) of the pulley wheel 34 vertically aligned with the eye formed by the loop 36 through which the first end of the particular cable section 35 passes. As illustrated in FIG. 19A, each of cable sections 35 is on the left side of each pulley wheel 34 as the cable section 35 extends between the pulley wheels and loops 36. Each of cable sections 35 engages a groove and makes a 90° turn as it traverses each pulley wheel 34.

The second end of cable section 37, having its first end connected to the loop 36 that is closest to side wall 12, is typically connected to cable portion 33 in a manner different from cable sections 35. This is because section 37 is usually too long to enable section 37 to be clamped to the segment of cable portion 33 that is to the right of the pulley wheel 34 closest to side wall 12. It is undesirable for cable section 37 to make a 90° turn over the pulley wheel 34 mounted at the top of side wall 12 because the clamp between section 37 and cable portion 33 would have to pass over this pulley wheel. Hence, cable section 37 extends upwardly from loop 36 to the right of the pulley wheel 34 that is closest to side wall 12, thence horizontally to the left. At the next pulley wheel 34 to the left, cable section 37 makes a 180° turn, as illustrated in FIG. 19B.

In response to wheel 30 being turned clockwise, as illustrated in FIG. 2, the vertical segment of cable portion 33 along wall 12 is pulled down to pull the horizontal segment of cable portion 33 to the right and draw upwardly the vertically extending segments of cable portion 33 and cable sections 35 and 37 that are connected to loops 33. As a result, tube 24 is pulled upwardly. In response to counterclockwise turning of wheel 30 the vertical segment of cable portion 33 along wall 12 rises to let the horizontal segment of cable portion 33 to move to the left and cause downward movement of the vertically extending segments of cable portion 33 and cable sections 35 and 37. This causes tube 24 to descend.

Tube 24 includes an internal shaft 38, FIGS. 8A and 8B, about which curtain 26 is wound. Tube 24 also includes elongated slot 40 (FIGS. 5, 7 and 12) through which curtain 26 extends. Slot 40 faces in a generally downward direction, but is located close to mesh 18, at about an 8 o'clock position (as illustrated in FIGS. 5, 7 and 12) so curtain 26 is typically pushed by the wind so it is close to or on mesh 18. Slot 40 extends the length of tube 24, slightly beyond the opposite vertically extending edges of curtain 26 and retaining mesh or grid 18.

Slotted, relatively soft plastic liner 49 is fixedly mounted on the interior wall of tube 24 so that curtain 26 is not damaged as the curtain is paid from and drawn into the tube through slot 40, even though the curtain typically contacts the interior tube wall as it is paid and drawn. Liner 49 is held in place by lips 51, carrying flanges 53 at the facing circumferential ends of sheet metal tube 24 that define slot 40.

Drive mechanism 42 for shaft 38 is fixedly carried by roller assembly 50, including rollers 52 that ride up and down on vertically extending shaft 54 to stabilize the position and movement of tube 24 and curtain 26. Shaft 54 is proximate side wall 12. The end of shaft 38 proximate side wall 13 extends beyond tube 24, and is captured between flanges of vertically extending channel 87 (FIG. 2).

Drive mechanism 42 turns shaft 38 clockwise and counterclockwise about the longitudinal axis of the shaft, to wind and unwind curtain 26 about shaft 38, thereby to raise and lower the bottom end of curtain 26 relative to tube 24 and grid 18. Winding and unwinding of curtain 26 about shaft 38 in tube 24 is independent of the up and down movement of the tube.

Shaft 38 is hollow and turned about its horizontal axis in response to manual or motorized turning of vertically extending rod 60 having a hooked end 62 that extends through eye 64 at one end of rod 66. The other end of rod 66 drives gear box 68. Gear box 68 includes (1) a first end plate 69 (FIG. 6) that abuts and is connected by bolts 73 to end plate 71 and (2) a second end plate 181 (FIG. 5) that abuts and is connected by bolts 58 to end plate 82 that is welded to sleeve 81 of end assembly 80. Sleeve 81 has an interior diameter slightly greater than the exterior diameter of tube 24 to hold in place the end of tube 24 proximate side wall 12. Sleeve 81 includes loop 36 to which cable section 37 is secured.

Gear box 68 has a horizontally extending output shaft 169 (FIG. 4) having a square cross section that fits through slot 84 in end plate 82. Shaft 169 fits into a socket (not shown) of solid stub-shaft 72 having a square cross section over which the interior square surfaces of hollow shaft 38 fit. Curtain 26 is wound about the exterior square cross section of shaft 38 within tube 24.

The end of curtain 26 in tube 24 is held in situ by channel 74 including base 76 and flanges 78, by virtue of the curtain end being clamped between the channel base and flanges and corresponding sides of shaft 38. Screws 180 hold channel 74 and curtain 26 fast against shaft 38.

Shaft 72 at the end of shaft 38 next to gear box 68 is coaxially aligned with the gear box output shaft 169. However, at the end of shaft 38 opposite from socket 72 and at intermediate regions of shaft 38, the shaft is subject to drooping. To accommodate such drooping, end assembly 83 (FIG. 10) is located at the end of tube 24 proximate side wall 13. End assembly 83 includes sleeve 81 and an end plate 82 with a vertically extending slot 84 that are the same as the corresponding parts of end assembly 80. In assembly 83, circular stub shaft 86 extends through slot 84. Stub shaft 86 carries collar 88 (FIGS. 10 and 13) within end assembly 83. One face of collar 88 bears against the interior side of end plate 82 to prevent substantial longitudinal movement of shaft 38 toward end wall 13. Shaft 38 is fixedly connected to stub shaft 86 by sleeve 188 that is bonded to the stub shaft and has a square cross section fitting over the exterior square cross section of shaft 38 to hold shaft 38 fast to shaft 86.

As illustrated in FIGS. 11 and 12, when a significant amount of curtain 26 is rolled up in tube 24, shaft 38 rides relatively low in slot 84 of end assembly 83. As curtain 26 is paid from shaft 38 the load on the shaft decreases, causing shaft 86 to ride higher in slot 84. Sleeves 81 also include slots 88 (FIG. 12) that are aligned with slot 40 and loops 36 containing eyes substantially aligned with the eyes on the remainder of tube 24.

Figure 21:
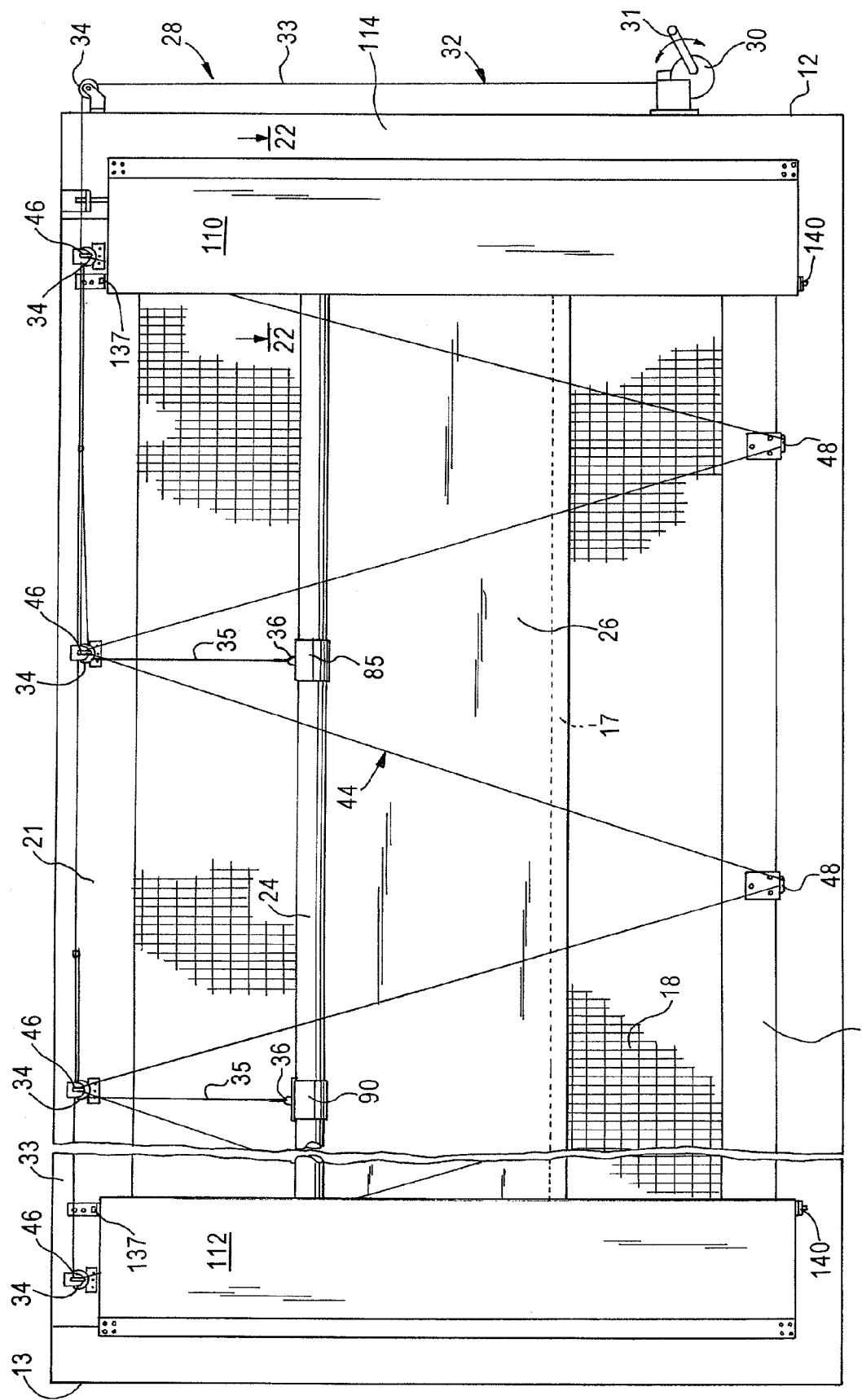
FIG. 21 is a view similar to the view illustrated in FIG. 2, but wherein shield plates at the opposite ends of the shelter are closed, instead of being open as illustrated in FIG. 2.

To facilitate assembly, installation and manufacturing of tube 24 and shaft 38, the tube and shaft are divided into longitudinal horizontal sections 89, each about 20 feet long. Adjacent sections are connected to each other by couplers 90 (FIGS. 2, 14 and 21).

Each of couplers 90 includes a slotted sleeve 92 that overlaps the ends of the adjacent sections 89 and extends across a gap 94 between the ends of the adjacent sections. The interior diameter of each sleeve 92 is slightly greater than the exterior diameter of adjacent sections 89 so the adjacent sections fit snugly into the sleeves. Each of sleeves 92 includes a threaded bore into which bolt 96 is screwed and held in place by the head of the bolt, located in gap 94 inside the sleeve.

Bolt 96 and nut 98 hold plate 100 in place on the exterior surfaces of adjacent sections 89. Plate 100 is slightly longer than sleeve 92 and includes, at its opposite ends, flanges 102 having walls that engage the opposite edges of the sleeve. Flanges 102 have bottom edges that dig into the outer diameter of the adjacent sections 89 of tube 24. As a result, coupler 90 holds adjacent tube sections 89 together.

Each plate 100 carries a loop 36 that forms an eye to receive the first end of cable sections 35. Sleeve 92 includes a slot (not shown) that is aligned with slot 40.

In response to shaft 60 being turned in a first direction about its vertical axis, shaft 66 turns a first, input shaft of gear box 68 that in turn rotates, in a clockwise direction, horizontally extending output shaft 169 of the gear box to drive shaft 38 in the clockwise direction, as illustrated in FIG. 7. Rotation of Shaft 38 in the clockwise direction results in curtain 26 being drawn upwardly into tube 24 through slot 40. In response to shaft 60 being turned in a second direction, output shaft 169 of gear box 68 and shaft 38 are driven in the counterclockwise direction, enabling curtain 26 to be paid downwardly through slot 40 from shaft 38 due to the weight of rod 17.

Each section of shaft 38 has a length approximately equal to the corresponding length of the section of tube 24 in which the shaft is located. FIG. 9 is a perspective view of adjacent shaft sections 104 in adjacent tube sections, such as sections 89, in combination with a sleeve 106 that is within each of couplers 90 to hold shaft sections 104 in place inside the couplers. Sleeve 106 has a square cross section with internal sides slightly smaller than the exterior walls of shaft sections 104. Sleeve 106 fits over shaft sections 104 and holds sections 104 in place. Sleeves 106 are longer than sleeves 90 so edges of sleeves 90 abut the edges of the channels 76 that hold curtain 26 in place. Longitudinal motion of sleeve 106 is thus restricted by the edges of channel 74.

Curtain 26 is a unitary structure, typically including sections that are sewn together. Curtain 26 extends between opposite ends of tube 24 over shaft sections 104 and sleeves 106 within couplers 90. Consequently, complete closing of open side 16 by curtain 26 is possible.

A structure including cable 44 prevents substantial movement of tube 24 and curtain 26 away from grid 18. Cable 44 includes elongated generally vertically extending portions that extend between (1) hooks 46 carried by pulley assemblies 34 on top face plate 21 above the top edge of grid 18 and (2) hooks 48 on bottom plate 19 below the bottom edge of the grid. As illustrated in FIGS. 19 and 20, cable 44 is wound about hooks 46 and 48 to maintain tube 24 and curtain 26 in proximity to grid 18, i.e., to prevent substantial movement of tube 24 and curtain 26 away from grid 18 in response to wind. Thus, tube 24 and curtain 26 are maintained between cable portions 45 and grid 18.

In FIG. 2, tube 24 is positioned by drive system 28 approximately at a vertical position of approximately ⅓ of the distance from the top of grid 18 and ⅔ of the distance from the bottom of the grid, while curtain 26 is paid by drive mechanism 42 through slot 40 of tube 24 such that the bottom of curtain 26 is approximately ⅓ of the way from the bottom edge of grid 18 and approximately ⅔ of the way from the top edge of the grid. In FIG. 2A, tube 24 is at the same position illustrated in FIG. 2, but curtain 26 has been paid through slot 40 of tube 24 so that the bottom edge of the curtain is slightly below the bottom edge of grid 18. In FIG. 2A, curtain 26 is at its lowest point of traverse, and is above base 20, so that no material of curtain 26 is gathered and the entire curtain remains taut. As a result, water, ice, rain, snow or dirt do not have an opportunity to accumulate in curtain 26 and the life of the curtain is not adversely affected by these environmental factors.

In the configurations of FIGS. 2 and 2A, air, for ventilation purposes for the animals within shelter 10, flows through grid 18 between the upper edge of the grid and the top of tube 24.

In the configuration of FIG. 2, air also flows through grid 18 between the bottom edge of curtain 26 and the bottom edge of grid 18, to provide increased ventilation for the animals in shelter 10. If, however, such ventilation is not required and/or desired, the curtain arrangement of FIG. 2A reduces the amount of air that flows through grid 18 to the animals in shelter 10.

In the configuration of FIG. 2B, almost maximum ventilation is provided because curtain 26 is wound completely about shaft 38 within tube 24, except for the edge of the curtain that protrudes through slot 40, while tube 24 is in proximity to its upper most position. In FIG. 2B, tube 24 is illustrated as being slightly below the top edge of grid or mesh 18. It is to be understood, however, that tube 24 can be driven so that it is above the top edge of grid 18 so that the tube is aligned with facing 21 above the top of grid 18, to provide maximum protection for tube 24 from the elements.

To protect the portions of curtain system 22 proximate side walls 12 and 13 and enable access to these portions of the curtain system, panels 110 and 112 are respectively mounted in proximity to sidewalls 12 and 13. Because panels 110 and 112 are the same, except for where they are mounted and the direction of rotation of a part thereof, only panel 110 is described.

Panel 110 extends vertically from the top face 21 to bottom face 19 and horizontally from side face 114 (between side wall 12 and the vertical edge of grid 18) to a position in front of grid 18 to the left of the left edge of side face 114, as illustrated in FIG. 21. Panel 110 enables the drive mechanism for shaft 38 and the stabilizing mechanism for the vertical position of tube 24, including roller assembly 50 and most of shaft 54 to be covered when the drive mechanism is not in use. Panel 110 is constructed to enable access to the shaft drive mechanism and the stabilizing mechanism, as necessary.

Figure 22:
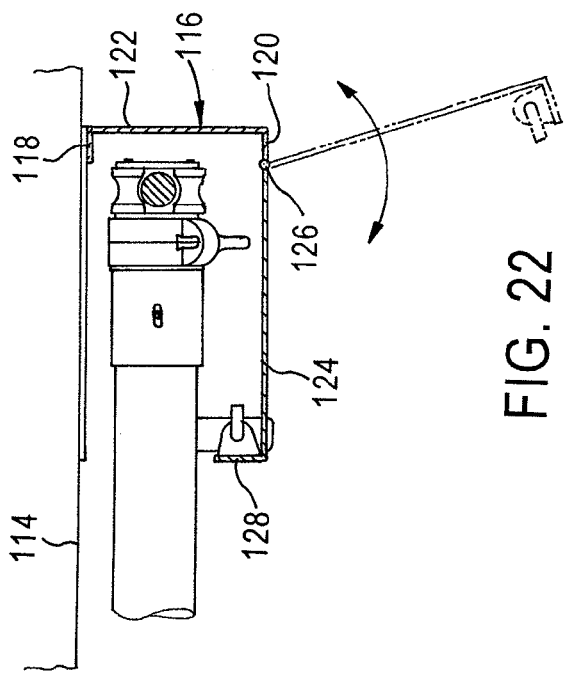
FIG. 22 is a view taken through the lines 22, FIG. 21.

Panel 110 includes elongated, vertically extending channel 116 (FIG. 22) having a first flange 118 that is fixedly mounted on side face 114, a second flange 120 and a base 122 having sufficient length between flanges 118 and 120 to accommodate the diameters of tube 24 and the drive for shaft 38 and the stabilizing structure for the tube. (Channel 87 that stabilizes the movement of shaft 86 (FIG. 2) corresponds to channel 116.) One vertically extending edge of plate 124 is pivotably mounted by hinge 126 (similar to a piano hinge) to the edge of flange 120 remote from base 122.

Figure 22B:
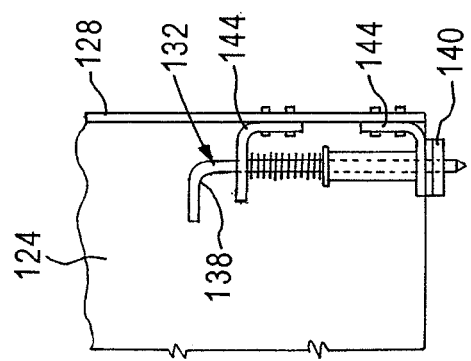
FIG. 22B is a front view of a mechanism at the bottom of the shield panel, for holding the shield panel in place.
Figure 22A:
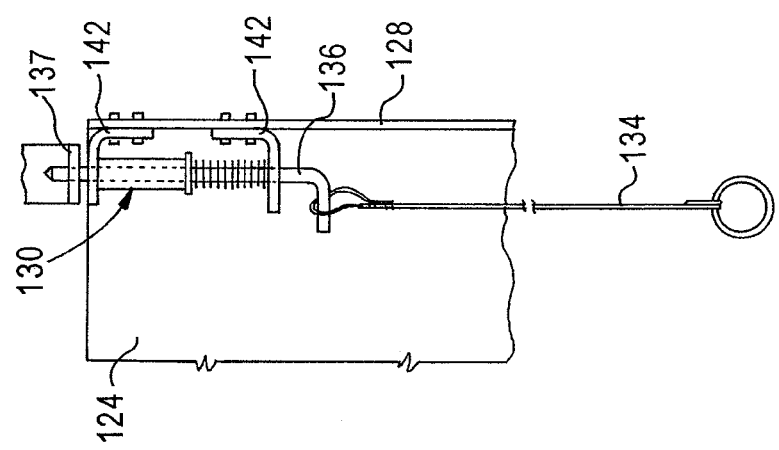
FIG. 22A is a side view of a mechanism at the top of the shield panel for holding the shield panel of FIG. 22 in place.

The upper and lower portions of flange 128 at the vertically extending edge of plate 124 opposite from hinge 126 carry spring biased locking mechanisms 130 and 132 (FIGS. 22A and 22B) that maintain plate 124 in place, aligned with flange 120, when access to the drive for shaft 38 and/or the stabilization mechanism for tube 24 is not needed. When such access is needed, locking mechanisms 130 and 132 are released by pulling down cord 134 so the spring biased bar 136 coupled to the cord is disengaged from the holes in bracket 137 that is fixedly mounted on top facing 21. The release occurs after spring biased bar 138 has been pulled up beyond the hole in plate 140 that is fixedly mounted on bottom facing 19. Brackets 142, fixedly mounted at the top of flange 128, hold locking mechanism 130 in place, while brackets 144, fixedly mounted at the bottom of flange 128, hold locking mechanism 132 in place. After locking mechanisms 130 and 132 have been released, plate 124 is turned outwardly about hinge 126, as illustrated by dotted and dashed lines in FIG. 22, to enable access to be gained to the structures that were previously shielded by being behind plate 124.

Different aspects of an alternative embodiment of the shaft within tube 28 are illustrated in FIGS. 15-18. Shaft 130 of FIGS. 15-18 has a circular periphery but is located and driven in tube 24 in a manner similar to the way shaft 38 is located and driven in the tube.

As illustrated in FIGS. 15A and 15B, shaft 130 includes two elongated sections 132 and 134, respectively including walls 136 and 137 having peripheries defined by different sectors of a circle having a common center 138, coincident with the axis of shaft 130. The peripheral segments of walls 136 and 137 have arcuate extents of about 330° and 30°, respectively. Section 134, made of somewhat elastic plastic, fits into and mates with surfaces of cavity 140 of section 132 to function as a keeper for the end of curtain 26 that remains in tube 24. Opposite ends of wall 136 include opposing ears 142 that extend from arcuate wall portions 144, between which extends arcuate base 146.

Section 134 includes opposed walls 148 that extend inwardly from the periphery of wall 138. Each of walls 148 includes (1) a recess 150 that mates with ears 142 and (2) arcuate legs 152 that extend inwardly from recesses 148 and 150 and have end portions that mate with the arcuate center portion of base 146.

The end portion of curtain 26 is placed in cavity 140 so that the curtain drapes over ears 142 and contacts the periphery of arcuate segment 144 on the right side of tube section 132, as illustrated in FIGS. 15A and 15B. Then, tube portion 134 is forced onto tube portion 132 so that recesses 150 engage ears 142, while the ends of legs 152 bear against the center portion of base 146 to hold curtain 26 in place within tube 24.

Couplers 153 between adjacent elongated sections of shaft 130 include coupling tube 154 having a cross section shaped somewhat as a kidney, with outer arcuate walls 156 and 158 having opposite end portions 160 that respectively mate with end portions of the interior of wall 136 and the surface of base 146 opposite from the surface of the base that contacts curtain 26. To prevent movement of tube 154 relative to the remainder of shaft 130, the interior surface of wall 136 includes ledge 157 that extends inwardly of wall 136 by a short distance and is aligned with the center axis 138 of shaft 130, as well as the center portion of base 146 that is closest to the center axis. Tube 154 includes an elongated notch 159 into which ledge 157 fits.

The static frictional forces (1) between the mating engaged surfaces at the opposite ends 160 of coupler tube 150 and (2) at the ends of tube portions 136 of the adjacent portions of tube 130 that are connected together by the coupler tube are such that the rotary motion of one section of shaft 130 is transmitted to the adjacent section of shaft 130 by coupler tube 154. These mating surfaces are the exterior surfaces of walls 156 and 158, the interior surfaces of wall 136 and base 146, the protruding surfaces of ledge 157 and the surfaces of recess 157.

FIGS. 17 and 18 are respectively views of the structures at the ends of shaft 130 proximate side walls 13 and 12, i.e., where shaft 130 is coupled (1) by tube 170, having a circular cross section, to a keeper formed by the flanges and base of vertically extending channel 87, and (2) by tube 172, having a square cross section, to stub shaft 70 that also has a square cross section. Shafts 170 and 172 respectively extend through openings in end plates 174 and 176, carried by sleeves 178 that are similar to sleeves 81 of the square shaft embodiment, except that sleeves 178 accommodate bearings 180 for shaft 130. Bearings 180 have the same kidney shaped cross section as couplers 154.

In response to rod 60 being turned in first and second opposite directions, shaft 130 freely turns in tube 24 to draw curtain 26 into the tube through slot 40 and enable the curtain to be paid through slot 40 from the shaft and tube.

While specific embodiments of the invention have been described and illustrated, variations regarding details of the embodiments specifically illustrated and described may be made without departing from the true spirit and scope of the invention as defined in the appended claims. For example, automatic control of the up and down movement of tube 24 and the vertical position of the end of curtain 26 can be provided by supplying signals from environmental detectors (e.g., wind direction and speed, temperature, humidity, rain) to a computer that derives output signals for activating motors having outputs connected to cable 32 and gear box 68.

While the curtain system has been illustrated and described for a shelter having only one open side, it is to be understood that the curtain system can be used on each side of buildings having more than one open side.

What is claimed is:

1. A curtain system for a side of a shelter for domestic farm animals, wherein the side is generally open except for (a) a restraining grid for the animals, (b) the curtain system and (c) a facing arrangement that holds the grid, the curtain system comprising a tube having an elongated axis, the tube adapted to be horizontally mounted outside the restraining grid, the tube having an elongated slot extending in the same direction as the elongated axis of the tube, the tube carrying a shaft extending in the same direction as the elongated axis of the tube and about which an elongated curtain is wound, the tube carrying the shaft so the shaft is inside the tube, the curtain having a horizontally extending end protruding through the slot, a first drive directly connected to the tube for raising and lowering the tube relative to the open side of the shelter, a second drive directly connected to the shaft for winding and unwinding the curtain about the shaft so that the winding and unwinding of the curtain cause the curtain to be raised and lowered relative to the open side of the shelter, the first and second drives being such that the raising and lowering of the tube and the winding and unwinding of the curtain are independent of each other, a restraining structure for causing the tube and curtain to be between the restraining structure and the grid and proximate the grid, the tube being divided into plural elongated sections, the elongated sections of the tube being coupled together end to end, the shaft being divided into plural elongated sections, each of the elongated sections of the shaft having a length approximately equal to the length of a corresponding section of the tube in which a particular elongated section of the shaft is located, and a coupler connecting adjacent ends of the shafts of the elongated shaft sections to each other, the curtain including a continuous piece of fabric extending across a plurality of the couplers and wound on a plurality of the plural elongated sections of the shaft, the curtain end extending through aligned slots in a plurality of the elongated sections of the tube and the couplers.

2. The curtain system of claim 1, wherein the first drive includes a cable and pulley arrangement connecting different portions along the length of the tube to a first rotary drive for the raising and lowering of the tube.

3. The curtain system of claim 2, wherein the second drive includes a second rotary drive coaxial with the shaft for turning the shaft about a longitudinal axis thereof.

4. The curtain system of claim 1, wherein the second drive includes a rotary drive coaxial with the shaft for turning the shaft about a longitudinal axis thereof.

5. The curtain system of claim 1, wherein the restraining structure for preventing substantial movement of the tube and curtain away from the grid includes an elongated element that extends from above the highest point of traverse of the tube to below the lowest point of traverse of the end of the curtain.

6. The curtain system of claim 5, wherein the elongated element includes a cable extending between hooks above the highest point of traverse of the tube and hooks below the lowest point of traverse of the end of the curtain.

7. The curtain system of claim 1, wherein the shaft has different vertical positions within the tube depending upon the vertical length of the curtain extending through the slot, a plate at the end of the tube remote from the drive arrangement for the shaft including an elongated vertically extending slot through which a portion of the shaft extends, the elongated vertically extending slot having a length sufficient to enable the shaft to have the different vertical positions within the tube.

8. The curtain system of claim 1, wherein the shaft periphery has a square cross-section about which the curtain is wound, a keeper fitting on the shaft holding a second end of the curtain in place on the shaft.

9. The curtain system of claim 8, wherein the keeper is shaped as a channel having a base extending across a first side of the square cross-section and flanges extending across portions of opposite second and third sides of the square cross-section.

10. The curtain system of claim 1, wherein the shaft periphery has a cross-section in the shape of a circle about which the curtain is wound, a first portion of the shaft having a periphery consisting of a first sector of the circle, the first shaft portion being fixedly connected to a second portion of the shaft having a periphery consisting of a second sector of the circle, the first portion of the shaft being a keeper holding a second end of the curtain in place on the second portion of the shaft.

11. The curtain system of claim 10, wherein the second portion of the shaft includes opposing ears and first arcuate surfaces, the first portion of the shaft including opposing recesses and second arcuate surfaces respectively mating with the opposing ears and first arcuate surfaces; the opposing ears, recesses, first and second arcuate surfaces holding the second end of the curtain in place.

12. The curtain system of claim 3, wherein the restraining structure includes a cable having elongated segments extending between hooks above the highest point of traverse of the tube and hooks below the lowest point of traverse of the end of the curtain, the tube and curtain being located between the cable elongated segments and the mesh.

13. The curtain system of claim 1 wherein the curtain is arranged to extend in a generally downward direction after passing through the slot in the tube when the curtain system is mounted on said side of the shelter.

14. In combination, a shelter for domestic farm animals, the shelter including a side that is generally open except for (a) a restraining grid for the animals, (b) a curtain system, and (c) a facing arrangement that holds the grid, the curtain system comprising a tube having an elongated axis, the tube being horizontally mounted outside the restraining grid, the tube having an elongated slot extending in the same direction as the elongated axis of the tube, the tube carrying a shaft extending in the same direction as the elongated axis of the tube and about which an elongated curtain is wound, the tube carrying the shaft so the shaft is inside the tube, the curtain having a horizontally extending end protruding through the slot, a first drive directly connected to the tube for raising and lowering the tube relative to the open side of the shelter, a second drive directly connected to the shaft for winding and unwinding the curtain about the shaft so that the winding and unwinding of the curtain cause the curtain to be raised and lowered relative to the open side of the shelter, the first and second drives being such that the raising and lowering of the tube and the winding and unwinding of the curtain are independent of each other, and a restraining structure for causing the tube and curtain to be between the restraining structure and the grid and proximate the grid, the open side having a substantial length, the tube being divided into plural elongated sections, together having lengths slightly greater than the substantial length of the open side, the elongated sections of the tube being coupled together end to end, the shaft being divided into plural elongated sections, each of the elongated sections of the shaft having a length approximately equal to the length of a corresponding section of the tube in which a particular elongated section of the shaft is located, and a coupler connecting adjacent ends of the shafts of the elongated shaft sections to each other, the curtain including a continuous piece of fabric extending across a plurality of the couplers and wound on a plurality of the plural elongated sections of the shaft and extending through the slots in a plurality of the elongated sections of the tube.

15. The combination of claim 14, wherein the shaft has different vertical positions within the tube depending on the load on the shaft, a plate at the end of the tube remote from the drive arrangement for the shaft including an elongated vertically extending slot through which a portion of the shaft extends, the elongated vertically extending slot having a length sufficient to enable the shaft to have the different vertical positions within the tube.

16. The combination of claim 15, wherein the shaft periphery has a square cross-section about which the curtain is wound, a keeper fitting on the shaft holding a second end of the curtain in place on the shaft.

17. The combination of claim 16, wherein the keeper is shaped as a channel having a base extending across a first side of the square cross-section and flanges extending across portions of opposite second and third sides of the square cross-section.

18. The combination of claim 15, wherein the shaft periphery has a cross-section in the shape of a circle about which the curtain is wound, a first portion of the shaft having a periphery consisting of a first sector of the circle, the first shaft portion being fixedly connected to a second portion of the shaft having a periphery consisting of a second sector of the circle, the first portion of the shaft being a keeper holding a second end of the curtain in place on the second portion of the shaft.

19. The combination of claim 18, wherein the second portion of the shaft includes opposing ears and first arcuate surfaces, the first portion of the shaft including opposing recesses and second arcuate surfaces respectively mating with the opposing ears and first arcuate surfaces; the opposing ears, recesses, first and second arcuate surfaces holding the second end of the curtain in place.

20. The combination of claim 14 wherein the curtain extends in a generally downward direction after passing through the slot in the tube.

* * * * *